(12) United States Patent
Buldorini et al.

(10) Patent No.: US 12,047,978 B2
(45) Date of Patent: Jul. 23, 2024

(54) RESOURCES ALLOCATION FOR UN-MANAGED COMMUNICATION LINKS

(71) Applicant: TELECOM ITALIA S.p.A., Milan (IT)

(72) Inventors: Andrea Buldorini, Turin (IT); Elena Demaria, Turin (IT); Maurizio Fodrini, Turin (IT); Ivano Guardini, Turin (IT); Marco Marchisio, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 513 days.

(21) Appl. No.: 17/311,786

(22) PCT Filed: Dec. 18, 2019

(86) PCT No.: PCT/EP2019/085903
§ 371 (c)(1),
(2) Date: Jun. 8, 2021

(87) PCT Pub. No.: WO2020/127455
PCT Pub. Date: Jun. 25, 2020

(65) Prior Publication Data
US 2022/0039083 A1   Feb. 3, 2022

(30) Foreign Application Priority Data
Dec. 20, 2018   (IT) .................. 102018000020509

(51) Int. Cl.
*H04W 72/51*   (2023.01)
*H04W 12/06*   (2021.01)
(Continued)

(52) U.S. Cl.
CPC .......... *H04W 72/51* (2023.01); *H04W 12/06* (2013.01); *H04W 72/044* (2013.01); *H04W 72/27* (2023.01); *H04W 76/10* (2018.02)

(58) Field of Classification Search
CPC ... H04W 12/062; H04W 76/15; H04W 72/12; H04W 72/51; H04W 72/50; H04W 72/04;
(Continued)

(56) References Cited

U.S. PATENT DOCUMENTS

2012/0102369 A1* 4/2012 Hiltunen ............... G06F 11/008
714/48
2013/0201902 A1   8/2013 Nagata et al.
(Continued)

OTHER PUBLICATIONS

European Office Action issued Dec. 20, 2022 in European Application 19831587.1, 4 pages.
(Continued)

*Primary Examiner* — Allahyar Kasraian
(74) *Attorney, Agent, or Firm* — Oblon, McClelland, Maier & Neustadt, L.L.P.

(57) ABSTRACT

A communication system includes a communication network and a communication system node. The communication system node communicates with the communication network via a first communication link, and establishes a second communication link with at least one user equipment to allow the user equipment to connect to the communication network. The second communication link is an unmanaged communication link. A backhauling provider module associated with the communication network dynamically allocates backhauling resources to the first communication link for data transmission between the node and the communication network based on the user equipment's parameters.

10 Claims, 3 Drawing Sheets

(51) Int. Cl.
*H04W 72/044* (2023.01)
*H04W 72/27* (2023.01)
*H04W 76/10* (2018.01)

(58) Field of Classification Search
CPC ... H04W 12/068; H04W 76/10; H04W 72/27; H04W 12/06; H04W 72/044; H04W 28/02
See application file for complete search history.

(56) References Cited

U.S. PATENT DOCUMENTS

2015/0349891 A1* 12/2015 Jung ................ H04B 10/25754
 398/68
2015/0373672 A1* 12/2015 Forssell ................ H04W 28/20
 370/329
2016/0119850 A1 4/2016 Kimura et al.
2019/0394135 A1* 12/2019 Hisano .................... H04L 12/44

OTHER PUBLICATIONS

International Search Report and Written Opinion issued Feb. 5, 2020 in PCT/EP2019/085903 filed Dec. 18, 2019.

* cited by examiner

RESOURCES ALLOCATION FOR UN-MANAGED COMMUNICATION LINKS

BACKGROUND OF THE INVENTION

Field of the Invention

The present invention generally relates to the telecommunications field. More specifically, the present invention relates to a method and a system for allocating resources.

Overview of the Related Art

In the telecommunications field, communication links connecting two devices (e.g., a user equipment and a network node) can be classified in two broad classes referred to as "un-managed communication links" and "managed communication links".

A managed communication link is a communication link that is managed by a coordinator entity which is responsible to manage the timing of data transmissions over the link, and to assign the resources (bandwidth) to be used for carrying out such data transmissions over the link. On the contrary, the timing of data transmissions carried out over an un-managed link and the bandwidth assigned to the latter are not managed by any coordinator entity.

An example of un-managed communication link is the communication link established between a user equipment (such as for example a smartphone, a tablet, a laptop, hereinafter referred to as "User Equipment" or simply "UE") and an Access Point (in short, "AP") by means of Wi-Fi technology (hereinafter, "Wi-Fi communication link"). When a plurality of different UEs are connected to a same AP through a Wi-Fi communication link, there is no managing entity which coordinates the transmission times of UEs, which are instead carried out according to a contention paradigm. More particularly, each UE transmits to the AP while at the same time listens for checking whether other UEs are carrying out transmissions to the AP that are colliding to its transmission. If a UE assesses that a collision is occurring, it interrupts its transmission toward the AP, and waits for a period before trying to transmit again.

An example of managed communication link is the communication link established between a UE and a transceiver station (such as a base station) of a mobile communication network (such as for example a 5G, 4G/LTE or 3G mobile communication network) managed by a provider (hereinafter, referred to as "network operator"). In this case, the timing of the data transmissions carried out between the UEs and the transceiver station is managed by the transceiver station under the control of policies of the network operator. Similarly, the bandwidth assigned for the data transmissions over this communication link is assigned under the control of policies of the network operator.

Therefore, compared to a Wi-Fi communication link (and generally to an un-managed communication link), a managed communication link provides a more efficient and reliable data transmission.

So called "backhaul communication links" are links between a radio access node of a mobile and/or cellular network and the corresponding core network.

Several solutions are known in the art directed to manage the resource allocation for transmissions involving backhaul communication links.

For example, patent application WO2012/059131 discloses measures for handover control for backhaul connections, said measures exemplarily comprising evaluation of the suitability of an access node cell in access network as target for a handover of a terminal based on delay information being indicative of an expected packet delay in a cell of the access node, wherein such delay information may be generated and/or exchanged in the access network. Said measures may exemplarily be applied for improving handover control in relay-enhanced access networks or networks that contain access nodes connected via different kinds of backhaul that can result in different end-to-end packet delays.

Patent application WO2013/006769 discloses a communication station, such as a base station or access point, having multiple backhaul options and distributing backhaul data between the available backhaul options. The communication station includes a transceiver for transmitting and receiving data with user equipments, multiple backhaul interface modules, and a backhaul distribution module arranged for monitoring demand for backhaul bandwidth and distributing data over the backhauls based on the demand for backhaul bandwidth. Additional modules for user data and control plane processing may be included with the user/control distinction used in distributing data over the backhauls. The backhaul options may include a preferred backhaul and an alternate backhaul. Distributing data over the backhauls may be based, for example, on applications associated with the data, financial cost, delay, robustness, computational resources, and/or additional security associated with using a particular backhaul.

SUMMARY OF INVENTION

The Applicant has found that while the above-cited solutions allow to increase the efficiency of transmissions over backhaul communication links (and generally over managed communication links), they do not take into considerations transmissions carried out over un-managed communication links, such as over Wi-Fi communication links.

In view of the above, the Applicant has tackled the problem of how to increase the efficiency of resource allocations for data transmissions.

In general terms, the present invention provides for having a communication network dynamically allocate backhauling resources for data transmission between the AP and the communication network based on UE parameters relating to the UEs currently connected to the AP.

One or more aspects of the present invention are set out in the independent claims, with advantageous features of the same invention that are set forth in the dependent claims (whose wording is enclosed herein verbatim by reference).

More particularly, the present invention relates, in one aspect, to a communication system.

According to an embodiment of the present invention, the communication system comprises a communication network.

According to an embodiment of the present invention, the communication system further comprises a communication system node which is in communication with the communication network through a first communication link, the communication system node being configured to establish a second communication link with at least one UE in order to allow said at least one UE to connect to said communication network, said second communication link being an un-managed communication link.

According to an embodiment of the present invention, the communication system further comprises a backhauling provider module associated with the communication network and configured to dynamically allocate backhauling resources to said first communication link for data transmission between the node and the communication network based on UE parameters relating to the at least one UE currently connected to the communication system node.

According to an embodiment of the present invention, said UE parameters comprise at least one among:
- a number of UEs currently connected to the communication system node;
- UE profiles assigned by an owner or provider of the communication system node to users of UEs through subscriptions;
- services enjoyed and/or exploited by the UEs;
- on-demand requests by the UEs.

According to an embodiment of the present invention, said UE parameters comprise the number of UEs currently connected to the communication system node and said UE profiles.

According to an embodiment of the present invention, the backhauling provider module comprises a management sub-module configured to assess the number of UEs currently connected to the communication system node, retrieve the UE profiles of said UEs currently connected to the communication system node, and calculate a bandwidth allocation configuration corresponding to a respective bandwidth value to be allocated to the UEs according to the assessed number of UEs and the retrieved UE profiles.

According to an embodiment of the present invention, the backhauling provider module further comprises an enforcer sub-module configured to receive from the management sub-module the calculated bandwidth allocation configuration and to allocate bandwidth to said first communication link for data transmission between the communication system node and the communication network according to the received calculated bandwidth allocation configuration.

According to an embodiment of the present invention, each UE profile assigned to a respective UE comprises a respective service class identifier among a set of service class identifiers, each service class identifier of the set being indicative of a respective quality or performance level for the access of UE to the communication system node.

According to an embodiment of the present invention, the management sub-module is configured to calculate a bandwidth allocation configuration for UEs whose respective UE profile comprise a same service class identifier, based on the number of UEs currently connected to the communication system node whose respective UE profile comprises said same service class identifier.

According to an embodiment of the present invention, the backhauling provider module is configured to calculate a bandwidth allocation configuration when a new UE is performing an authentication procedure with the communication system node and the communication network.

According to an embodiment of the present invention, the backhauling provider module is configured to calculate a bandwidth allocation configuration when a UE already connected to the communication node is disconnecting from the communication system node.

According to an embodiment of the present invention, the backhauling provider module is further configured to calculate a bandwidth allocation configuration conditioned to the reception of alarm notifications.

According to an embodiment of the present invention, said communication system node is an access point, and said second communication link is a Wi-Fi communication link, an unlicensed LTE communication link, or a bluetooth communication link.

According to an embodiment of the present invention, said communication network is a mobile communication network selected among:
- a 5G mobile communication network;
- a 4G/LTE mobile communication network;
- a 3G mobile communication network.

According to an embodiment of the present invention, said communication network is a wired communication network selected between:
- a fiber communication network, and
- a xDSL communication network.

In a further aspect, the present invention relates with a method for providing telecommunication resources to at least one UE through a communication network, comprising:
- configuring a communication system node which is in communication with the communication network through a first communication link so as to establish a second communication link with at least one UE in order to allow said at least one UE to connect to said communication system node, said second communication link being an un-managed communication link;
- dynamically allocating telecommunication resources to said first communication link for data transmission between the node and the communication network based on UE parameters relating to said at least one UE currently connected to the communication system node.

BRIEF DESCRIPTION OF THE ANNEXED DRAWINGS

These and other features and advantages of the present invention will be made apparent by the following description of some exemplary and non-limitative embodiments thereof. For its better intelligibility, the following description should be read making reference to the attached drawings, wherein.

DETAILED DESCRIPTION OF PREFERRED EMBODIMENTS OF THE INVENTION

Figure 1:
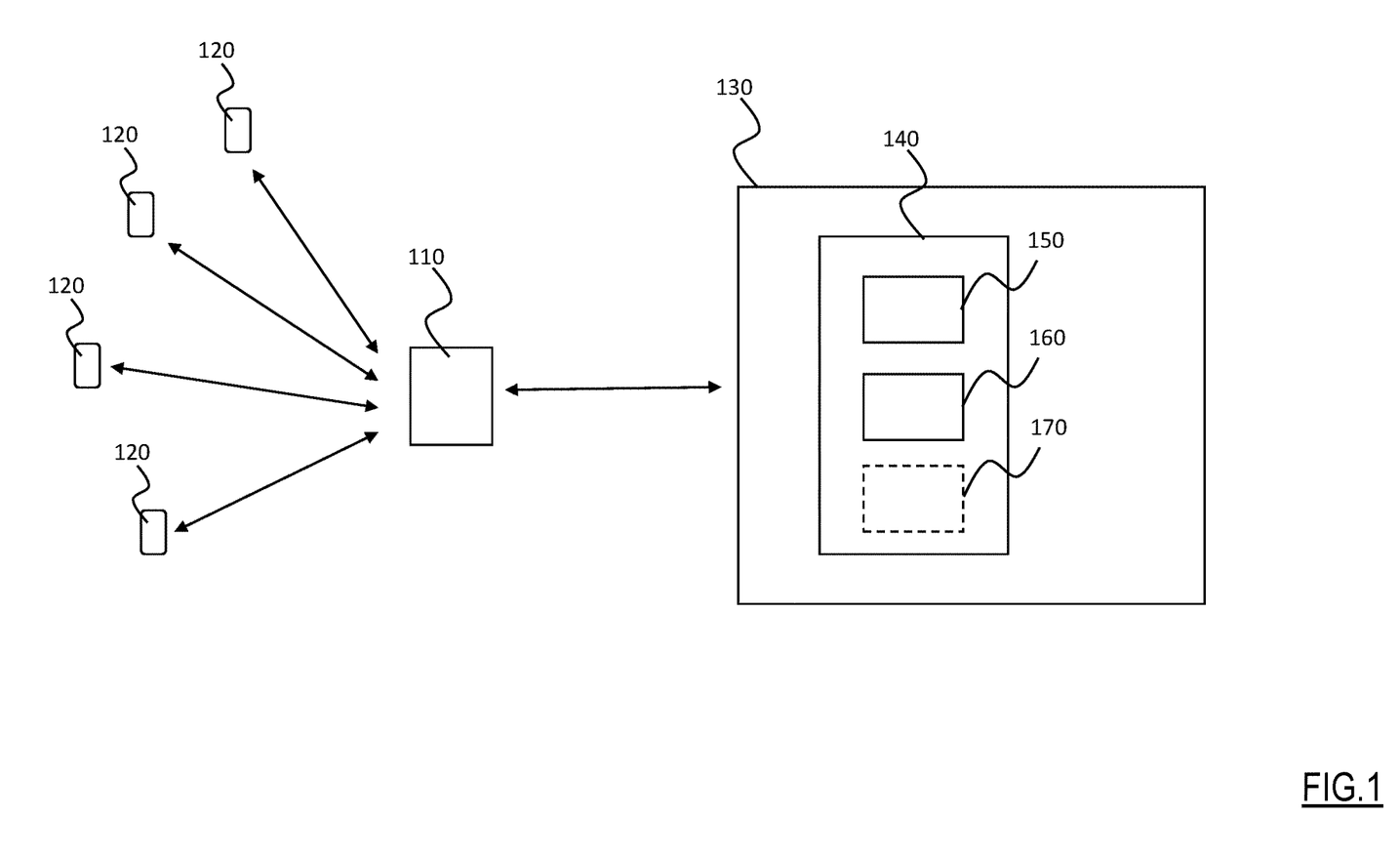
FIG. 1 schematically illustrates in terms of very generic functional blocks a communication system according to an embodiment of the present invention.

With reference to the drawings, FIG. 1 schematically illustrates in terms of very generic functional blocks a communication system 100 according to an embodiment of the present invention.

The communication system 100 comprises an AP 110 configured to establish an un-managed wireless communication link, such as for example a Wi-Fi communication link or an unlicensed LTE communication link or a bluetooth communication link, with one or more UEs 120 (e.g., smartphones, tablets, laptops) in order to allow such UEs 120 to connect to a communication network 130, such as for example a mobile communication network (e.g., a 5G, 4G, 3G, or LTE mobile communication network) or a wired communication network (e.g., a fiber or xDSL communication network). The communication network 130 is managed by a corresponding network operator, such as a telecommunication company (e.g., a mobile network operator). The AP 110 is managed by a corresponding AP owner or provider, such as for example the owner or manager of a physical location or facility (e.g., a restaurant, a shop, a hotel) wherein the AP 110 is located. The AP owner owns a subscription with the network operator of the communication network 130, so as to avail of the communication capabilities of the latter for offering connectivity services (e.g., Internet access) to the users of the UEs 120 connected to the AP 110 (e.g., customers of a restaurant, shop. hotel).

The communication network 130 is globally schematized in FIG. 1 by means of a single block, but the communication network 130 generally can comprise a plurality of modules, units, nodes (not explicitly illustrated) whose kind, structure and number depends on the specific communication network 130.

The connection between a generic UE 120 and the communication network 130 provides for a first segment which involves an un-managed communication link (from UE 120 to AP 110) and a second segment which involves a managed communication link (the backhauling connection from AP 110 to communication network 130).

In general terms, the present invention provides for having the communication network 130 dynamically allocate backhauling resources (i.e., bandwidth) to the communication link between the AP 110 and the communication network 130 for data transmission between the AP 110 and the communication network 130 based on UE parameters relating to the UEs 120 currently connected to the AP 110.

Such UE parameters may comprise at least one among:
a number of UEs 120 currently connected to the AP 110,
profiles assigned through subscriptions by the AP owner or by the network operator to the users of the UEs 120 currently connected to the AP 110;
services (e.g., web browsing or streaming) enjoyed and exploited by the UEs 120 currently connected to the AP 110;
on-demand requests (e.g., a bandwidth increase following the installation of a new app) carried out by the UEs 120 currently connected to the AP 110.

Additionally, the backhauling resources may also be dynamically allocated to the communication link between the AP 110 and the communication network 130 for data transmission between the AP 110 and the communication network 130 in response to external events, such as for example when an alarm system tries to send videos to a UE 120 currently connected to the AP 110.

According to an embodiment of the present invention, the dynamical allocation of backhauling resources for data transmission between the AP 110 and the communication network 130 is carried out by a backhauling provider module 140.

According to an embodiment of the present invention, the backhauling provider module 140 may comprise hardware, firmware, a combination of hardware and software, software located and/or executed on servers being part of, or being used for operation by, the communication network 130. For example, making reference to the case in which the communication network 130 is a mobile communication network, such as a 5G, 4G/LTE or 3G mobile communication network, the backhauling provider module 140 may be a process running on a processor, a processor, an object, an executable, a thread of execution, a program, and/or a computing device located at the core network and/or at nodes (e.g., base stations) of the communication network 130.

According to an embodiment of the present invention, the backhauling provider module 140 comprises a management sub-module 150 and an enforcer sub-module 160. According to an embodiment of the present invention, the management sub-module 150 may be implemented in a Home Subscriber Server (HSS) or in a policy manager node of the communication network 130. According to an embodiment of the present invention, the enforcer sub-module 160 may be implemented in the HSS, or in a node of the communication network 130 through which backhauling resources can be managed (such as for example in a gateway).

According to an embodiment of the present invention, the management sub-module 150 is configured to retrieve information about profiles of UEs 120 assigned by the AP owner and/or by the network operator. For this purpose, according to an embodiment of the present invention, the management sub-module 150 is configured to access profile databases, for example profile databases of the AP owner and/or of the network operator.

On this regard, according to an embodiment of the present invention, the AP owner and/or the network operator associates to each UE 120 subscribed to access the AP 110 a corresponding user profile UP which comprises identification parameters adapted to identify such UE 120. According to an embodiment of the present invention, the identification parameters comprise:
a username chosen by the user of the UE 120;
a telephone number, such as a telephone number associated to the UE 120;
an email address;
a social network access username;
a service class identifier $C(i)$ (e.g., gold/silver) indicative of a respective quality and/or performance level for the access of the UE 120 to the AP 110.

In any case, the concepts of the present inventions can be applied also in case the identification parameters of a user profile UP comprise only a username and a service class identifier $C(i)$.

According to an embodiment of the present invention, the management sub-module 150 is further configured to assess (and update) the number of UEs 120 currently connected to the AP 110, and their user profiles (e.g., by checking the profile databases).

According to an embodiment of the present invention, the management sub-module 150 is further configured to implement decision rules relating to the dynamical allocation of backhauling resources for data transmission between the AP 110 and the communication network 130. According to an embodiment of the present invention which will be described in greater detail in the following of the present description, said decision rules can be based, for example, on the number of UEs 120 currently connected to the AP 110, and on the user profiles UP of said UEs 120 currently connected to the AP 110.

According to an embodiment of the present invention, the management sub-module 150 is further configured to calculate (and update) a bandwidth allocation configuration for data transmission between the AP 110 and the communication network 130 according to the previously mentioned decision rules, and to communicate said calculated bandwidth allocation configuration to the enforcer sub-module 160.

According to an embodiment of the present invention, the enforcer sub-module 160 is configured to set the backhauling resources for data transmission between the AP 110 and the communication network 130 by allocating the bandwidth for data transmission between the AP 110 and the communication network 130 based on the received bandwidth allocation configuration. As will be described in greater detail in the following of the present description, this allocation of bandwidth is dynamic, since it may involve variations in (e.g., increasing/reducing) the currently allocated bandwidth based on the number of UEs 120 currently connected to the AP 110, and on the user profiles UP of said UEs 120 currently connected to the AP 110.

According to an embodiment of the present invention, the backhauling provider module 140 may further comprise an optional sub-module, referred to as profile setting sub-module 170, configured to allow the AP owner to visualize and modify the user profiles UP associated to the UEs 120 in order to set the identification parameters identifying such UEs 120. According to an embodiment of the present invention, the profile setting sub-module 170 is implemented as a portal accessible by the AP owner. According to an embodiment of the present invention, the profile setting sub-module 170 can be directly offered by the network operator of the communication network 130 or can be offered by a service provider having an agreement with the network operator. The profile setting sub-module 170 is configured to communicate with the management sub-module 150 in order to send the (possibly modified) user profiles UP to the latter. According to an advantageous embodiment of the present invention, the user profiles UP may be transcoded for mapping each service class identifier C(i) on a respective bandwidth value made available by the communication network 130 for backhauling purposes and/or on other different parameters of the backhauling service offered by the communication network 130. The profile setting sub-module 170 is optional, since the user profiles UP can be directly set and provided by the network operator.

It has to be appreciated that the users of the UEs 120 which are accessing the AP 110 are in general customers of the AP owner, or at least they have some connection to the AP owner (since they made a subscription for availing of the connectivity service offered by the AP 110), while no relationship is required at all between said users and the network operator of the communication network 130. In other words, there is no need that the users of the UEs 120 have subscribed any kind of contract with the network operator of the communication network 130.

According to an embodiment of the present invention, the AP owner generates user profiles UP for the UEs 120 subscribed to access the AP 110 independently from the kind of any other subscription the users of the UEs 120 have made with the network operator. In this case, it is important that the user profiles UP are sent to the communication network 130, and particularly to the backhauling provider module 140. However, nothing prevents from having the backhauling provider module 140 which is also further configured to dynamically allocate backhauling resources by also taking into consideration whether a UE 120 accessing the AP 110 is subscribed to the communication network 130 or not. According to an embodiment of the present invention, instead of generating the user profiles UP from the start, the AP owner may take advantage of already available user profiles UP generated by the network operator of the communication network 130.

Figure 2:
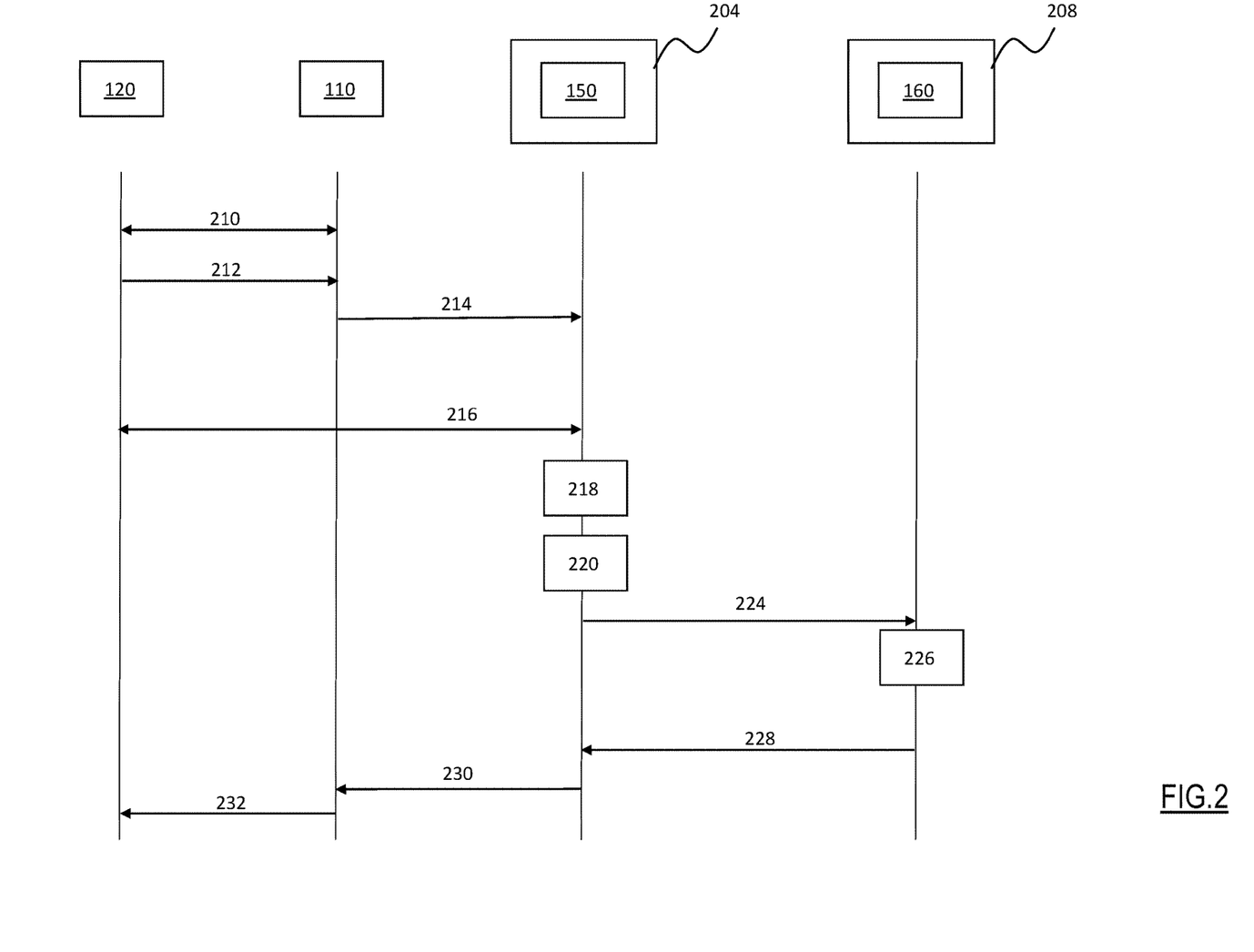
FIG. 2 is a diagram showing how a UE, an AP and a backhauling provider module of the communication system of FIG. 1 interact according to an embodiment of the present invention.

In order to describe how the backhauling provider module 140 operates according to an embodiment of the present invention for dynamically allocating backhauling resources (i.e., bandwidth) to the communication link between the AP 110 and the communication network 130 for data transmission between the AP 110 and the communication network 130, reference will be now made to FIG. 2.

In particular, FIG. 2 is a swim lane diagram showing how a UE 120, the AP 110 and the backhauling provider module 140 interact according to an embodiment of the present invention.

In the embodiment of the invention illustrated in FIG. 2, the management sub-module 150 of the backhauling provider module 140 is implemented at an Authentication, Authorization and Accounting (AAA) server node 204 of the communication network 130, and the enforcer sub-module 160 of the backhauling provider module 140 is implemented at a Policy and Charging Rules Function (PCRF) node 208 of the communication network 130 configured to determine policy rules for the communication network 130 in real time.

According to an embodiment of the invention, the dynamical allocation of backhauling resources carried out by the backhauling provider module 140 provides for executing the following sequence of operations every time a new UE 120 is performing an authentication procedure with the AP 110 and the AAA server node 204.

The first phase (210) provides for a UE 120 which establishes an un-managed wireless communication link, such as for example a Wi-Fi communication link or an unlicensed LTE communication link, with the AP 110.

At this point, an authentication procedure is started involving the UE 120, the access point AP 110 and the AAA server node 204. According to an embodiment of the present invention, the authentication procedure is an Extensible Authentication Protocol (EAP)—Authentication and Key Agreement (AKA) authentication procedure, however similar considerations apply if different authentication procedures are used.

The UE 120 sends (212) a request for authentication to the AP 110.

Then, the AP 110 forwards (214) the received authentication request to the AAA server node 204 by sending the IP address of the AP 110 together with a home domain of the UE 120 (i.e., a string which identifies the network operator to which the user of the UE 120 has subscribed).

A credential verify procedure (e.g., of the EAP-AKA type) is then carried out (216) between the UE 120 and the AAA server node 204.

According to an embodiment of the present invention, in case the AAA server node 204 assesses that the credential verify procedure is successful (218), instead of already terminating the authentication procedure, the management sub-module 150 executes a backhauling configuration calculation procedure 220 directed to calculate a proper bandwidth allocation configuration for data transmission between the AP 110 and the communication network 130.

Figure 3:
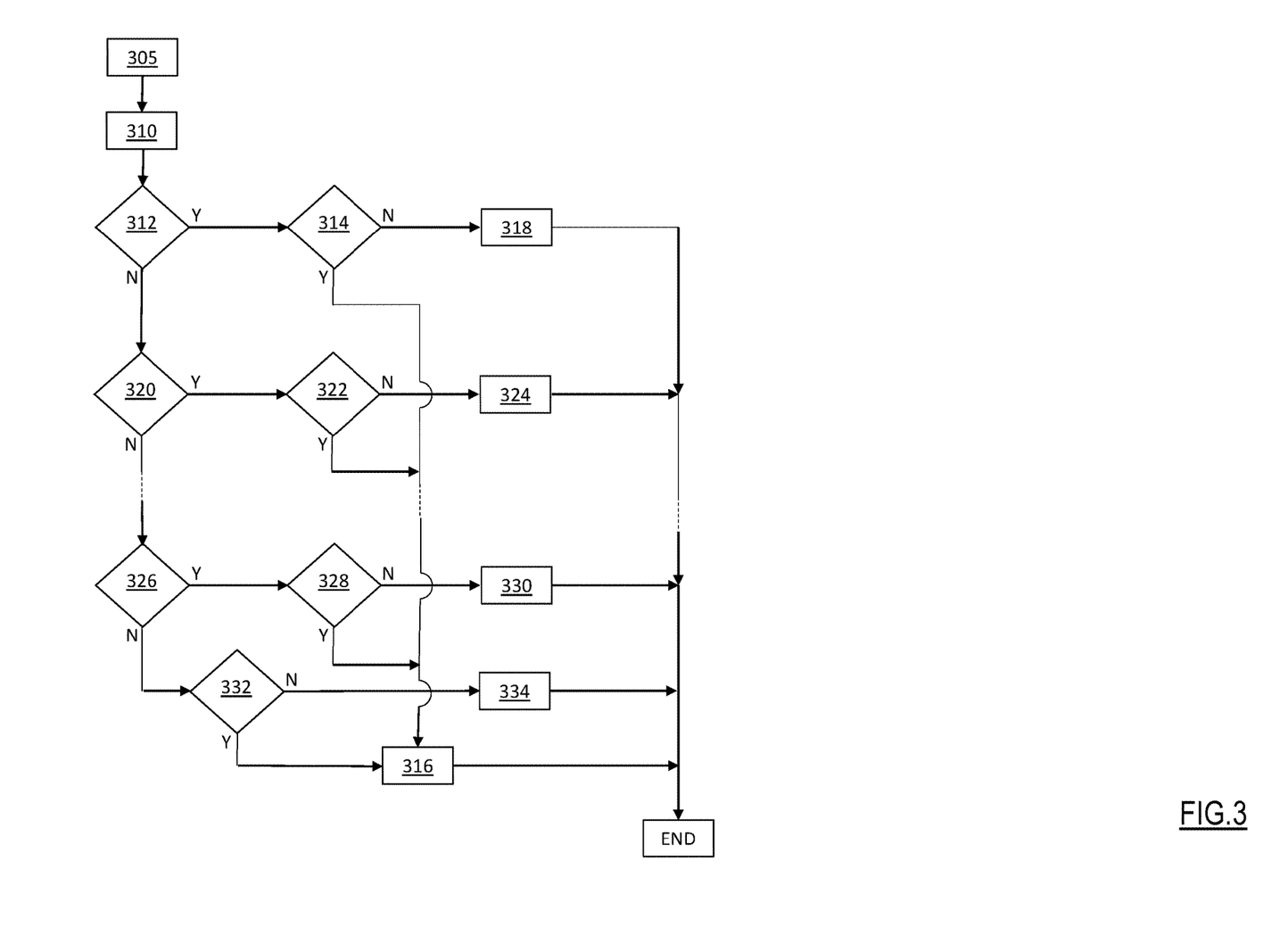
FIG. 3 illustrated a backhauling configuration calculation procedure carried out by the backhauling provider module according to an embodiment of the present invention.

The backhauling configuration calculation procedure 220 according to an embodiment of the present invention is described in detail by making reference to the flow diagram illustrated in FIG. 3.

As stated previously, the AP owner and/or the network operator associates to each UE 120 subscribed to access the AP 110 a corresponding user profile UP which comprises a service class identifier C(i) (e.g., gold/silver) indicative of a quality of access of the UE 120 to the AP 110; according to an embodiment of the present invention, for each service class identifier C(i), a corresponding set of n+1 bandwidth allocation configurations (or backhauling configurations) BC(i)(j) (j=0, 1, . . . n) is defined, each one corresponding to a respective bandwidth value (e.g., BC(i)(1)=10 Mbit/sec, BC(i)(2)=40 Mbit/sec, BC(i)(3)=100 Mbit/sec, . . . ) to be allocated to the UEs 120 corresponding to said service class identifier C(i) for data transmission between the AP 110 and the communication network 130. The generic j-th bandwidth allocation configuration BC(i)(j) corresponds to a bandwidth value lower than the next (j+1)-th bandwidth allocation configuration BC(i)(j+1).

Moreover, according to an embodiment of the present invention, for each service class identifier C(i), a plurality n of thresholds Th(i)(k) (k=1, 2, . . . n) is defined, with the generic k-th threshold Th(i)(k) that is lower than the next (k+1)-th threshold Th(i)(k+1).

The backhauling configuration calculation procedure 220 starts with the management sub-module 150 that checks the user profile UP corresponding to the UE 120 having just terminated the (successful) credential verify procedure, in order to retrieve the corresponding service class identifier C(i) (operation 305).

Then, a number N(i) of UEs 120 currently connected to the AP 110 and having the same service class identifier C(i) of the retrieved one is accordingly updated (operation 310). In this case, since a new UE 120 corresponding to the service class identifier C(i) is connecting to the AP 110, the number N(i) is incremented by one.

According to an embodiment of the present invention, the backhauling configuration calculation procedure 220 provides for comparing the number N(i) with the thresholds Th(i)(k), and selecting one of the bandwidth allocation configurations BC(i)(j) based on the result of this comparison. According to an embodiment of the present invention, when the number N(i) is lower than the lowest threshold Th(i)(1), the selected bandwidth allocation configuration BC(i)(j) is the bandwidth allocation configuration BC(i)(0) corresponding to the lowest bandwidth value of the set.

The number N(i) is firstly compared with the highest threshold Th(i)(n) (block 312). If N(i)≥Th(i)(n) (exit branch Y of block 312), a check is made for assessing whether the currently selected bandwidth allocation configuration is the bandwidth allocation configuration BC(i)(n) or not (block 314). If the currently selected bandwidth allocation configuration is already the bandwidth allocation configuration BC(i)(n) (exit branch Y of block 314), the current bandwidth allocation configuration BC(i)(n) is maintained (block 316, then, the backhauling configuration calculation procedure 220 ends). If instead the currently selected bandwidth allocation configuration is different from the bandwidth allocation configuration BC(i)(n) (exit branch N of block 314), the bandwidth allocation configuration BC(i)(n) is selected (block 318, then, the backhauling configuration calculation procedure 220 ends).

If N(i)<Th(i)(n) (exit branch N of block 312), the number N(i) is then compared with the next lower threshold Th(i)(n−1) (block 320). If N(i)≥Th(i)(n−1) (exit branch Y of block 320), a check is made for assessing whether the currently selected bandwidth allocation configuration is the bandwidth allocation configuration BC(i)(n−1) or not (block 322). If the currently selected bandwidth allocation configuration is already the bandwidth allocation configuration BC(i)(n−1) (exit branch Y of block 322), the current bandwidth allocation configuration BC(i)(n−1) is maintained (block 316, then, the backhauling configuration calculation procedure 220 ends). If instead the currently selected bandwidth allocation configuration is different from the bandwidth allocation configuration BC(i)(n−1) (exit branch N of block 322), the bandwidth allocation configuration BC(i)(n−1) is selected (block 324, then, the backhauling configuration calculation procedure 220 ends).

If not ended, this procedure is reiterated until N(i) is compared with the lowest threshold Th(i)(1) (block 326). If N(i)≥Th(i)(1) (exit branch Y of block 326), a check is made for assessing whether the currently selected bandwidth allocation configuration is the bandwidth allocation configuration BC(i)(1) or not (block 328). If the currently selected bandwidth allocation configuration is already the bandwidth allocation configuration BC(i)(1) (exit branch Y of block 328), the current bandwidth allocation configuration BC(i)(1) is maintained (block 316, then, the backhauling configuration calculation procedure 220 ends). If instead the currently selected bandwidth allocation configuration is different from the bandwidth allocation configuration BC(i)(1) (exit branch N of block 328), the bandwidth allocation configuration BC(i)(1) is selected (block 330, then, the backhauling configuration calculation procedure 220 ends).

Finally, if N(i)<Th(i)(1) (exit branch N of block 326), a check is made for assessing whether the currently selected bandwidth allocation configuration is the bandwidth allocation configuration BC(i)(0) corresponding to the lowest bandwidth value of the set or not (block 332). If the currently selected bandwidth allocation configuration is already the bandwidth allocation configuration BC(i)(0) (exit branch Y of block 332), the current bandwidth allocation configuration BC(i)(1) is maintained (block 316, then, the backhauling configuration calculation procedure 220 ends). If instead the currently selected bandwidth allocation configuration is different from the bandwidth allocation configuration BC(i)(0) (exit branch N of block 332), the bandwidth allocation configuration BC(i)(0) is selected (block 334, then, the backhauling configuration calculation procedure 220 ends).

It has to be appreciated that the backhauling configuration calculation procedure 220 illustrated in FIG. 3 is only an example. The concepts of the present invention can be directly applied to any other procedure providing for comparing the number N(i) of UEs 120 having the same service class identifier C(i) which are currently connected to the AP 110, and selecting one of the bandwidth allocation configurations BC(i)(j) based on the result of this comparison.

Returning back to FIG. 2, once the backhauling configuration calculation procedure 220 is terminated, and the management sub-module 150 selected a new bandwidth allocation configuration BC(i)(j) for the service class identifier C(i), or if it assessed to select again the current bandwidth allocation configuration BC(i)(j), it communicates (224) the selected bandwidth allocation configuration BC(i)(j) to the enforcer sub-module 160.

The enforcer sub-module 160 enforces the selected bandwidth allocation configuration BC(i)(j), allocating (226) the corresponding bandwidth value to the communication link between the AP 110 and the communication network 130 for data transmission between the AP 110 and the communication network 130. The enforcing of the selected bandwidth allocation configuration BC(i)(j) may be carried out according to one of the known standards used for backhauling purposes, and will not be described in the present description.

Once the selected bandwidth allocation configuration BC(i)(j) is enforced, the enforcer sub-module 160 sends (228) an acknowledgement signal to the AAA server node 204, and then the authentication procedure is terminated with the AAA server node 204 that sends (230) an authentication success signal to the AP 110, and the AP 110 that forwards (232) such authentication success signal to the UE 120.

The operation of the backhauling module 140 described above with reference to the embodiment of the invention illustrated in FIGS. 2 and 3 provides for increasing the backhauling resources (i.e., bandwidth) in response to the connection of new UEs 120 (belonging to one or more service class identifiers C(i)) to the AP 110. Naturally, the concepts of the present invention extend to cover also the case in which one or more UEs 120 already connected to the AP 110 disconnect from the AP 110 itself. In this case, when a UE 120 having a service class identifier C(i) is disconnecting from the AP 110, the manager sub-module 150 of the backhauling module 140 runs the configuration calculation procedure 220, updating the number N(i) of UEs 120 corresponding to the service class identifiers C(i)) currently connected to the AP 110 by decrementing such number N(i) by one (see operation 310 illustrated in FIG. 3). Then, as described previously with reference to FIG. 3, a bandwidth allocation configuration BC(i)(j) corresponding to the service class identifier C(i) is accordingly selected and communicated to the enforcer sub-module 160, which allocates the bandwidth value corresponding to the selected bandwidth allocation configuration BC(i)(j) to the communication link between the AP 110 and the communication network 130 for data transmission between the AP 110 and the communication network 130.

Thanks to the proposed solution, it is therefore possible to advantageously allocate backhauling resources in a dynamical way to the communication link between the AP 110 and the communication network 130 to be exploited by the UEs 120 connected to the AP 110 by means of an un-managed communication link. Compared to the know solutions, in which the bandwidth available to UEs connected to an AP trough an un-managed communication link (e.g., a Wi-Fi communication link) is fixed, with the proposed solution it is instead possible to vary the available bandwidth taking into account the current number of UEs 120 connected to the AP 110. Moreover, thanks to the provision of different service class identifiers C(i), the allocation of bandwidth can be advantageously tailored to take into account of the possibility that different UEs 120 may have different priorities based on the kind of subscription users of the UEs 120 made with the AP owner.

Naturally, in order to satisfy local and specific requirements, a person skilled in the art may apply to the present invention many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the present invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the present invention may be incorporated in any other embodiment as a matter of general design choice.

More specifically, the present invention lends itself to be implemented through a configuration calculation procedure different from the one illustrated with reference to FIG. 3, (by using similar steps, removing some steps being not essential, or adding further optional steps); moreover, the steps may be performed in different order, concurrently or in an interleaved way (at least partly).

Moreover, while the embodiments of the invention described in detail relates to a scenario in which the actors involved are one or more UEs 120, at least one AP 110, a communication network 130 and a backhauling provider module 140 located at nodes of the communication network 130, the concepts of the present invention can be also extended to a case in which a further communication network different from the communication network 130 is also present (managed by a different network operator), which is responsible to the storage and management of the user profiles UP for the UEs 120 which are subscribed to access the AP 110. In this case, the credential verify procedure (e.g., EAP-AKA) described with reference to 216 of FIG. 2 may be carried out between the UE 120 and an AAA server node of this further communication network.

Although in the present description reference has been made to a dynamical allocation of backhauling resources which exploits a classification of UEs 120 by means of a plurality of different service class identifiers C(i), similar considerations apply in case the UEs 120 are not classified. In this case, the operations of the backhauling provider module 140 can be carried out in the same way as described above by considering the presence of only a single service class identifier C(i). In other words, in this case, the allocation of backhauling resources is carried out by taking into account only the number of UEs 120 currently connected to the AP 110.

Similar considerations apply if, in addition to (or in place of) the number of UEs 120 currently connected to the AP 110 and/or their profiles (service class identifiers C(i)), the backhauling provider module 140 is configured to allocate backhauling resources to the communication link between the AP 100 and the communication network 130 by taking into account different UE parameters, such as an indication of the services (e.g., web browsing or streaming) exploited by the UEs 120 or based on on-demand requests carried out by the UEs 120. Moreover, according to another embodiment of the present invention, the backhauling provider module 140 may be also configured to vary the backhauling resources in response to external events, such as for example in response to external alarms.

Moreover, while in the detailed description reference has been mainly made to a scenario in which the un-managed communication link between UE 120 and the AP 110 is a Wi-Fi communication link, similar considerations apply in case such un-managed communication link is different, such as for example an unlicensed LTE communication link or a bluetooth communication network. Furthermore, while in the detailed description reference has been mainly made to a communication network 130 which is a mobile communication network such as a 5G, 4G/LTE or 3G mobile communication network, similar considerations apply in case the communication network is a wired communication network, such as a fiber or xDSL communication network.

The invention claimed is:

1. A communication system comprising:
a communication network;
a communication system node which is in communication with the communication network through a first communication link, the communication system node being configured to establish a second communication link with at least one user equipment (UE) in order to allow said at least one UE to connect to said communication network, said second communication link being an un-managed communication link;
a computing device associated with the communication network and including processing circuitry configured to dynamically allocate backhauling resources to said first communication link for data transmission between the node and the communication network based on UE parameters relating to said at least one UE currently connected to the communication system node, wherein the processing circuitry is configured to calculate a bandwidth allocation configuration when a new UE is performing an authentication procedure with the communication system node and the communication network and to calculate a bandwidth allocation configuration when a UE already connected to the communication node is disconnecting from the communication system node.

2. The communication system of claim 1, wherein said UE parameters comprise at least one among:
a number of UEs currently connected to the communication system node;
UE profiles assigned by an owner or provider of the communication system node to users of UEs through subscriptions;
services enjoyed and/or exploited by the UEs;
on-demand requests by the UEs.

3. The communication system of claim 1, wherein said UE parameters comprise a number of UEs currently connected to the communication system node and UE profiles, the
processing circuitry being configured to assess the number of UEs currently connected to the communication system node, retrieve the UE profiles of said UEs currently connected to the communication system node, and calculate a bandwidth allocation configuration corresponding to a respective bandwidth value to be allocated to the UEs according to the assessed number of UEs and the retrieved UE profiles.

4. The communication system of claim 3, wherein the processing circuitry is configured to receive from a management sub-module a calculated bandwidth allocation configuration and to allocate bandwidth to said first communication link for data transmission between the communication system node and the communication network according to the received calculated bandwidth allocation configuration.

5. The communication system of claim 4, wherein:
each UE profile assigned to a respective UE comprises a respective service class identifier among a set of service class identifiers, each service class identifier of the set being indicative of a respective quality or performance level for the access of UE to the communication system node;
the processing circuitry is configured to calculate a bandwidth allocation configuration for UEs whose respective UE profile comprise a same service class identifier, based on the number of UEs currently connected to the communication system node whose respective UE profile comprises said same service class identifier.

6. The communication system of claim 3, wherein the processing circuitry is further configured to calculate a bandwidth allocation configuration conditioned to a reception of alarm notifications.

7. The communication system of claim 1, wherein said communication system node is an access point, and said second communication link is a Wi-Fi communication link, an unlicensed LIE communication link, or a bluetooth communication link.

8. The communication system of claim 1, wherein said communication network is a mobile communication network selected among:
a 5G mobile communication network;
a 4G/LIE mobile communication network;
a 3G mobile communication network.

9. The communication system of claim 1, wherein said communication network is a wired communication network selected between:
a fiber communication network, and
a xDSL communication network.

10. A method for providing telecommunication resources to at least one user equipment (UE) through a communication network comprising:
configuring a communication system node which is in communication with the communication network through a first communication link so as to establish a second communication link with at least one UE in order to allow said at least one UE to connect to said communication system node, said second communication link being an un-managed communication link;
dynamically allocating telecommunication resources to said first communication link for data transmission between the node and the communication network based on UE parameters relating to said at least one UE currently connected to the communication system node,
wherein the method includes calculating a bandwidth allocation configuration when a new UE is performing an authentication procedure with the communication system node and the communication network and calculating a bandwidth allocation configuration when a UE already connected to the communication node is disconnecting from the communication system node.

* * * * *